United States Patent
Xu et al.

(10) Patent No.: US 10,982,069 B2
(45) Date of Patent: Apr. 20, 2021

(54) ACID RESISTANT CARBON COMPOSITES, METHODS OF MANUFACTURE, AND ARTICLES FORMED THEREOF

(71) Applicants: Zhiyue Xu, Cypress, TX (US); Lei Zhao, Houston, TX (US)

(72) Inventors: Zhiyue Xu, Cypress, TX (US); Lei Zhao, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 464 days.

(21) Appl. No.: 15/899,955

(22) Filed: Feb. 20, 2018

(65) Prior Publication Data
US 2018/0298158 A1    Oct. 18, 2018

Related U.S. Application Data

(60) Provisional application No. 62/486,061, filed on Apr. 17, 2017.

(51) Int. Cl.
*C08K 3/04* (2006.01)
*C08J 3/20* (2006.01)
(Continued)

(52) U.S. Cl.
CPC .............. *C08K 3/042* (2017.05); *C08J 3/203* (2013.01); *C08J 2327/18* (2013.01); *C08K 7/24* (2013.01); *E21B 33/1208* (2013.01)

(58) Field of Classification Search
CPC .. C08K 3/042; C08K 7/24; C08J 3/203; C08J 2327/18; E21B 33/1208; E21B 34/16;
(Continued)

(56) References Cited

U.S. PATENT DOCUMENTS

| 2007/0142547 A1* | 6/2007 | Vaidya ............... E21B 33/1208 |
| | | 524/847 |
| 2016/0108703 A1 | 4/2016 | Xu et al. |
| 2016/0186031 A1 | 6/2016 | Zhao et al. |

FOREIGN PATENT DOCUMENTS

| CN | 103367765 A | 10/2013 |
| CN | 104616908 A | 5/2015 |

OTHER PUBLICATIONS

Rajeev, et al., Corrosion mitigation of the oil well steels using organic inhibitors—A review, J. Mater. Environ. Sci. 2012: 3(5): 856-869 (Year: 2012).*

(Continued)

*Primary Examiner* — Daniel C. McCracken
(74) *Attorney, Agent, or Firm* — Cantor Colburn LLP (57) ABSTRACT

An article comprising a carbon composite containing carbon microstructures having interstitial spaces among the carbon microstructures; and a binder disposed in at least some of the interstitial spaces; wherein the carbon microstructures comprise unfilled voids within the carbon microstructures; and the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether.

12 Claims, 2 Drawing Sheets

(51) Int. Cl.
*C08K 7/24* (2006.01)
*E21B 33/12* (2006.01)
(58) Field of Classification Search
CPC ......... E21B 33/12; F16J 15/02; C01B 32/182;
C01B 32/198; C01B 2204/00; C01B
2204/02; C01B 2204/04; C01B 2204/06;
C01B 2204/065; C01B 2204/20; C01B
2204/22; C01B 2204/24; C01B 2204/26;
C01B 2204/28; C01B 2204/30; C01B
2204/32; C01B 32/20; C01B 32/205;
C01B 32/21; C01B 32/215; C01B 32/22;
C01B 32/225; C01B 32/23
See application file for complete search history.

(56) References Cited

OTHER PUBLICATIONS

Cai, et al., Study on temperature distribution along wellbore of fracturing horizontal wells in oil reservoir, Petroleum 2015; 1: 358-365 (Year: 2015).*
International Search Report, International Application No. PCT/US2018/022418, dated Jun. 29, 2018, Korean Intellectual Property Office; International Search Report 5 pages.
International Written Opinion, International Application No. PCT/US2018/022418, dated Jun. 29, 2018, Korean Intellectual Property Office; International Written Opinion 7 pages.
Raffaele Gilardi et al., "Graphitic Carbon Powders for Polymer Applications", Polymers and Polymeric Composites: A Reference Series, 2015, pp. 401-424.

* cited by examiner

ACID RESISTANT CARBON COMPOSITES, METHODS OF MANUFACTURE, AND ARTICLES FORMED THEREOF

CROSS REFERENCE TO RELATED APPLICATIONS

This application claims the benefit of U.S. Provisional Application Ser. No. 62/486,061, filed Apr. 17, 2017, the entire disclosure of which is incorporated herein by reference.

BACKGROUND

Graphite is an allotrope of carbon and has a layered, planar structure. In each layer, the carbon atoms are arranged in hexagonal arrays or networks through covalent bonds. Different carbon layers however are held together only by weak van der Waals forces.

Graphite has been used in a variety of applications including electronics, atomic energy, hot metal processing, coatings, aerospace and the like due to its excellent thermal and electrical conductivities, lightness, low friction, and high heat and corrosion resistances. Graphite, however, is not elastic and has low strength. To improve the elasticity and mechanical strength of graphite, various graphite composites have been proposed. Despite all the advances, the industry is always receptive to new graphite materials having further improved properties such as improved resistance to strong acids at high pressure and high temperature environments.

BRIEF DESCRIPTION

The above and other deficiencies in the prior art are overcome by, in an embodiment, an article comprising a carbon composite containing carbon microstructures having interstitial spaces among the carbon microstructures; and a binder disposed in at least some of the interstitial spaces; wherein the carbon microstructures comprise unfilled voids within the carbon microstructures; and the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether.

A method of forming the article comprises: compressing a composition containing carbon and a binder at a temperature that is about 10° C. to about 50° C. higher than the melting point of the binder and a pressure of about 500 psi to about 30,000 psi to form the article.

A method of isolating or completing a wellbore comprises deploying an apparatus comprising one or more of the article in the wellbore, wherein the article is exposed to a fluid containing sulfuric acid, nitric acid, hydrochloric acid, acetic acid, or a combination comprising at least one of the foregoing at a temperature of greater than 150° F.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have found that carbon composites formed from graphite and micro- or nano-sized acid resistant binders have improved acid resistance at an elevated pressure and temperature. The new carbon composites have excellent mechanical strength. In addition, the carbon composites have excellent elasticity, heat resistance, and chemical resistance at high temperatures. In a further advantageous feature, the composites keep various superior properties of the graphite such as heat conductivity, electrical conductivity, lubricity, and the like.

Without wishing to be bound by theory, it is believed that the improvement in acid resistance is provided by an acid resistant binding phase formed among carbon microstructures. At high temperatures such as at a temperature above the melting point of the binder, the micro- or nano-sized binder liquefies so that it is dispersed evenly among carbon microstructures. Upon cooling, the binder solidifies and forms a binding phase binding the carbon nanostructures together through mechanical interlocking.

Further without wishing to be bound by theory, for the composites having both improved mechanical strength and improved elasticity, it is believed that the carbon microstructures themselves are laminar structures having spaces between the stacked layers. The binder only selectively locks the microstructures at their boundaries without penetrating the microstructures. Thus the unbounded layers within the microstructures provide elasticity and the binding phase disposed among the carbon microstructures provides mechanical strength.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a binding phase formed from micro- or nano-sized binder. For example, a binding phase can occupy about 10 vol % to about vol 90%, about 50 vol % to about 90 vol %, about 70 vol % to about 90 vol %, about 10 vol % to about 30 vol %, or about 20 vol % to about 50 vol %, or about 20 vol % to about 40 vol % of the interstitial spaces among the carbon microstructures. However, the binder does not penetrate the individual carbon microstructures and the voids within the carbon microstructures are unfilled, i.e., not filled with any binder. Thus the carbon layers within the carbon microstructures are not locked together by a binder. Through this mechanism, the flexibility of the carbon composites, particularly, carbon composites containing expanded graphite microstructures can be preserved.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 $g/cm^3$, or about 0.1 to about 2 $g/cm^3$.

As used herein, graphite includes one or more of the following: natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Advantageously, the carbon composites comprise expanded graphite microstructures. Compared with other forms of the graphite, expanded graphite has high flexibility, high compression recovery, and larger anisotropy. The composites formed from expanded graphite and a micro- or nano-sized acid resistant binder under high pressure and high temperature conditions can thus have excellent acid resistance in addition to desirable mechanical strength and elasticity.

In the carbon composites, the carbon microstructures are held together by a binding phase. The binding phase comprises a binder which binds carbon microstructures by mechanical interlocking. The thickness of the binding phase is about 0.1 to about 100 microns or about 1 to about 20 microns. The binding phase can form a continuous or discontinuous network that binds carbon microstructures together. In an embodiment, no individual particles are present in the binding phase. In the carbon composites, the basal planes of the carbon microstructures can be substantially parallel.

Exemplary binders include a polytetrafluoroethylene (PTFE), polyvinyl fluoride (PVF), polyvinylidene fluoride (PVDF), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTEF), a peroxide cured copolymer of tetrafluoroethylene and propylene (FEPM), a fluorocarbon rubber (FKM); perfluorocarbon rubber (FFKM), a perfluoropolyether (PFPE), or a combination comprising at least one of the foregoing. Polytetrafluoroethylene is specifically mentioned. These materials can be in different shapes, such as particles, fibers, and wires. Combinations of the materials can be used.

The binder used to make the carbon composite is micro- or nano-sized. In an embodiment, the binder has an average particle size of about 0.05 to about 20 microns, specifically, about 0.05 to about 10 microns, about 0.5 to about 5 microns, more specifically about 0.1 to about 3 microns. Without wishing to be bound by theory, it is believed that when the binder has a size within these ranges, it disperses uniformly among the carbon microstructures.

The carbon composites comprise about 20 to about 60 wt. %, about 30 to about 50 wt. %, or about 35 to about 45 wt. % of carbon, based on the total weight of the composites. The binding phase or the binder is present in an amount of about 40 wt. % to about 80 wt. % or about 50 wt. % to about 70 wt. %, or about 55 wt. % to about 65 wt. %, based on the total weight of the composites.

Figure 1:
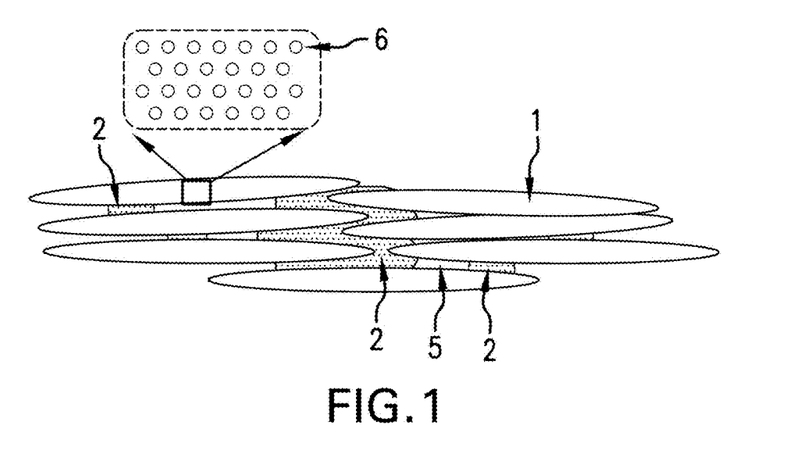
FIG. 1 is a schematic illustration of a carbon composite according to an embodiment of the disclosure.

An embodiment of a carbon composite is illustrated in FIG. 1. As shown in FIG. 1, the composite comprises carbon microstructures 1 and binding phase 2 locking the carbon microstructures. The carbon composite contains interstitial space 5 among carbon microstructures 1. Within carbon microstructures, there are unfilled voids 6.

The carbon composites can optionally comprise a filler. Exemplary filler includes one or more of the following: carbon fibers; carbon black; mica; clay; glass fibers; ceramic fibers; or ceramic hollow structures. Ceramic materials include SiC, $Si_3N_4$, $SiO_2$, BN, and the like. The filler can be present in an amount of about 0.5 to about 10 wt. % or about 1 to about 8%, based on the total weight of the carbon composite.

The composites can have any desired shape including a bar, block, sheet, tubular, cylindrical billet, toroid, powder, pellets, or other form that may be machined, formed or otherwise used to form useful articles of manufacture. The sizes or the dimensions of these forms are not particularly limited. Illustratively, the sheet has a thickness of about 10 μm to about 10 cm and a width of about 10 mm to about 2 m. The powder comprises particles having an average size of about 10 μm to about 1 cm. The pellets comprise particles having an average size of about 1 cm to about 5 cm.

One way to form the carbon composites is to compress a combination comprising carbon and a micro- or nano-sized binder to provide a green compact by cold pressing; and to compressing and heating the green compact at a temperature above the melting temperature of the binder thereby forming the carbon composites. The processes can be referred to as two-step processes. Alternatively, a combination comprising carbon and a micro- or nano-sized binder can be compressed and heated directly at a temperature above the melting point of the binder to form the carbon composites. The process can be referred to as a one-step process.

In the combination, the carbon such as graphite is present in an amount of 20 to about 60 wt. %, about 30 to about 50 wt. %, or about 35 to about 45 wt. %, based on the total weight of the combination. The binder is present in an amount of about 40 wt. % to about 80 wt. % or about 50 wt. % to about 70 wt. %, or about 55 wt. % to about 65 wt. %, based on the total weight of the combination.

The graphite in the combination can be in the form of a chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns. The density of the combination is about 0.01 to about 0.05 g/cm$^3$, about 0.01 to about 0.04 g/cm$^3$, about 0.01 to about 0.03 g/cm$^3$ or about 0.026 g/cm$^3$. The combination can be formed by blending the graphite and the micro- or nano-sized binder via any suitable methods known in the art. Examples of suitable methods include ball mixing, acoustic mixing, ribbon blending, vertical screw mixing, and V-blending.

Referring to the two-step process, the pressure to form the green compact can be about 500 psi to about 10 ksi and the temperature can be about 20° C. to about 200° C. The reduction ratio at this stage, i.e., the volume of the green compact relative to the volume of the combination, is about 40% to about 80%. The density of the green compact is about 0.1 to about 5 g/cm$^3$, about 0.5 to about 3 g/cm$^3$, or about 0.5 to about 2 g/cm$^3$.

The green compact can be heated at a temperature that is about 10° C. to about 50° C. higher or about 10° C. to about 30° C. higher or about 10° C. to about 20° C. higher than the melting point of the binder. When the temperature is higher, the binder becomes less viscose and flows better, and less pressure may be required in order for the binder to be evenly distributed in the voids among the carbon microstructures. However, if the temperature is too high, it may have detrimental effects to the instrument.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. For example, the combination comprising the graphite and the micro- or nano-sized binder can be charged with a current, which flows through the combination generating heat very quickly. Optionally, the heating can also be conducted under an inert atmosphere, for example, under argon or nitrogen. In an embodiment, the green compact is heated in the presence of air.

The heating can be conducted at a pressure of about 500 psi to about 30,000 psi or about 1000 psi to about 5000 psi. The pressure can be a superatmospheric pressure or a subatmospheric pressure. Without wishing to be bound by theory, it is believed that when a superatmospheric pressure is applied to the combination, the micro- or nano-sized binder is forced into the voids among carbon microstructures through infiltration. When a subatmospheric pressure is applied to the combination, the micro- or nano-sized binder can also be forced into the voids among the carbon microstructures by capillary forces.

In an embodiment, the desirable pressure to form the carbon composites is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the carbon composites can be applied. The temperature and the pressure can be held at the predetermined maximum temperature and the predetermined maximum pressure for about 5 minutes to about 120 minutes. In an embodiment, the predetermined maximum temperature is about 10° C. to about 50° C. higher than the melting point of the binder.

The reduction ratio at this stage, i.e. the volume of the carbon composite relative to the volume of the green compact, is about 10% to about 70% or about 20 to about 40%. The density of the carbon composite can be varied by controlling the degree of compression. The carbon composites have a density of about 0.5 to about 10 g/cm$^3$, about 1 to about 8 g/cm$^3$, about 1 to about 6 g/cm$^3$, about 2 to about 5 g/cm$^3$, about 3 to about 5 g/cm$^3$, or about 2 to about 4 g/cm$^3$.

In another embodiment, the carbon composite can be made from the combination of the graphite and the binder directly without making the green compact. The pressing and the heating can be carried out simultaneously. Suitable pressures and temperatures can be the same as discussed herein for the second step of the two-step process.

Hot pressing is a process that applies temperature and pressure simultaneously. It can be used in both the one-step and the two-step processes to make carbon composites.

The carbon composites can be made in a mold through a one-step or a two-step process. The obtained carbon composites can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the carbon composite can be directly molded to the useful shape by choosing the molds having the desired shape.

Sheet materials such as web, paper, strip, tape, foil, mat or the like can also be made via hot rolling. In an embodiment, the carbon composite sheets made by hot rolling can be further heated to allow the binder to effectively bond the carbon microstructures together.

Carbon composite pellets can be made by extrusion. For example, a combination of the graphite and the micro- or nano-sized binder can be first loaded in a container. Then combination is pushed into an extruder through a piston. The extrusion temperature can be about 10 to about 50° C. higher than the melting point of the binder. In an embodiment, wires are obtained from the extrusion, which can be cut to form pellets. In another embodiment, pellets are directly obtained from the extruder. Optionally, a post treatment process can be applied to the pellets. For example, the pellets can be heated in a furnace above the melting temperature of the binder so that the binder can bond the carbon microstructures together if the carbon microstructures have not been bonded or not adequately bonded during the extrusion.

Carbon composite powder can be made by milling carbon composites, for example a solid piece, through shearing forces (cutting forces). It is noted that the carbon composites should not be smashed. Otherwise, the voids within the carbon microstructures may be destroyed thus the carbon composites lose elasticity.

The carbon composites have a number of advantageous properties and can be used in a wide variety of applications. In an especially advantageous feature, by forming carbon composites, both the acid resistance and mechanical strength are improved.

Figure 2:
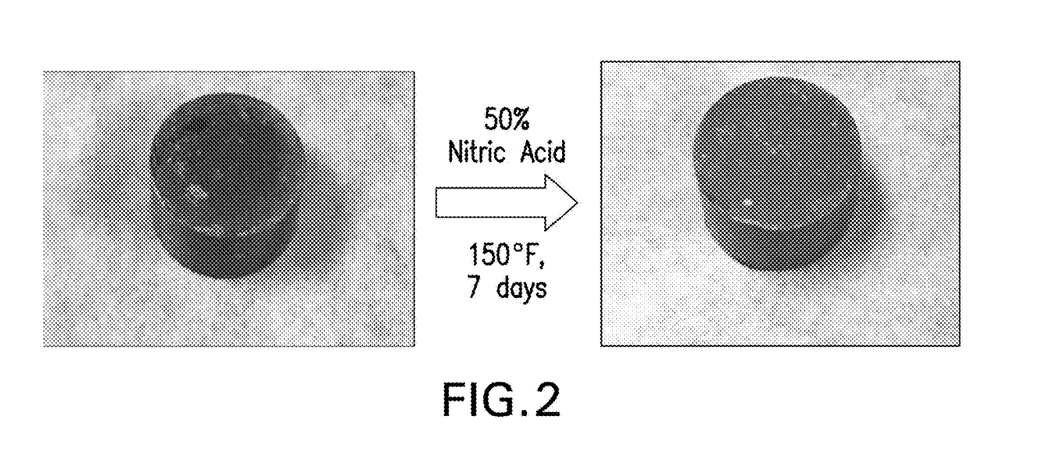
FIG. 2 compares a carbon composite before and after exposing to 50 vol % nitric acid at a temperature of 150° C. and a pressure of 150 psi for 7 days.
Figure 3:
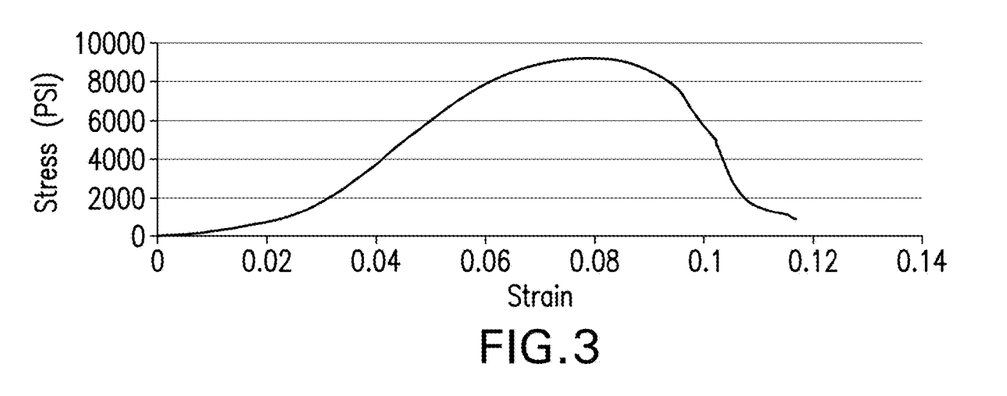
FIG. 3 shows a stress-strain curve of a carbon composite according to an embodiment of the disclosure.

To illustrate the improved properties of the carbon composite, a sample was prepared by compressing a composition containing about 40 wt. % of expanded graphite and about 60 wt. % of polytetrafluoroethylene powder with a particle size of less than 20 microns at a temperature of about 350° C. Acid resistance and unconfined compressive test results are shown in FIGS. 2 and 3.

The carbon composites have excellent acid resistance properties at an elevated temperature an elevated temperature. FIG. 2 compares a carbon composite before and after exposing to 50 vol % nitric acid at a temperature of 150° C. and a pressure of 150 psi for 7 days. As shown in FIG. 2, there are no changes to the carbon composite sample after the test.

The carbon composites disclosed herein can have chemical resistance to various types of acids at 50 vol % or higher acid concentration. Exemplary acids include sulfuric acid, nitric acid, hydrochloric acid, acetic acid, or a combination comprising at least one of the foregoing. The carbon composites can have high acid resistance with a range of operation temperatures up to about 500° F., specifically up to about 300° F., and more specifically about 200° F. The carbon composite can have high acid resistance at a pressure of about 50 psi to about 5000 psi or a pressure of about 100 psi to about 3000 psi. In an embodiment, the carbon composites or articles thereof can be used continuously at a temperature of about 68° F. to about 500° F. and a pressure of about 100 psi to about 3000 psi for more than 10 day, more than 20 days, or more than 30 days when exposed to sulfuric acid, nitric acid, hydrochloric acid, acetic acid, or a combination comprising at least one of the foregoing, wherein the acid is at 50 vol % or higher acid concentration. As used herein, "continuously resistive" or "continuously" means that less than about 10 wt. %, less than about 5 wt. %, less than about 2 wt. %, or less than about 1 wt. % of the carbon composite or the article containing the carbon composite is thermally cracked, thermally degraded, and/or thermally decomposed based on the total weight of the carbon composite of the article containing the carbon composite.

In addition to improved acid resistance, the carbon composites can also have excellent mechanical strength. FIG. 3 shows that an exemplary carbon composite sample according to the disclosure can have an unconfined compressive strength of about 900 psi.

The carbon composites are useful for preparing articles for a wide variety of applications including but are not limited to electronics, atomic energy, hot metal processing, coatings, aerospace, automotive, oil and gas, and marine applications. The carbon composites may be used to form all or a portion of an article. Accordingly, articles comprising the carbon composites are provided. Advantageously, the article is a sealing element.

Illustrative sealing elements include, for example, seals such as static seals or dynamic seals; seal seats; packoffs seals such as retrievable cementing packoff, polished bore receptacle packoff, wireline packoff; packers; joint sheets; gaskets; bridge plugs; packing, such as pump packing, valve packing, or the like. There can be overlap among different types of sealing elements. Static seals refer to seals between two stable and immovable components and include C-rings, E-rings, O-rings, U-rings, T-rings, L-rings, rectangular rings, square rings, x-sectioned rings, and the like. Dynamic seals are not particularly limited and include any seals between a pair of relatively movable members. A gasket is a mechanical seal which fills the space between two or more mating surfaces. Exemplary gaskets include high performance gaskets subject to pressure and heat, for example, head gaskets and exhaust gaskets for automobiles and flange gaskets for refineries. The sealing elements have excellent elastic properties. Thus they can fill in the gaps and imperfections in the surfaces to be sealed providing fluid-tight or airtight seals. The sealing elements can further have high heat resistance and durability and can be used in a wide temperature ranges.

The articles can be a downhole element. Illustrative articles include seals, high pressure beaded frac screen plugs, screen base pipe plugs, coatings for balls and seats, compression packing elements, expandable packing elements, O-rings, bonded seals, bullet seals, sub-surface safety valve seals, sub-surface safety valve flapper seal, dynamic seals, V-rings, back-up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, and sleeves.

The carbon composites have a high thermal resistance with a range of operation temperatures from about −65° F. up to about 1200° F. Accordingly, the downhole articles such as packers can be used to produce hydrocarbons from a subterranean location having an ambient temperature of greater than 750° F. or greater than 1000° F.

The downhole articles can also be used to isolate or complete a wellbore. The method comprises deploying an apparatus comprising one or more of the downhole articles in a wellbore. For example, the article can be of a type suited for filling an annulus within a borehole in a location surrounding one or more production tubulars. As used herein, the term "production tubulars" is defined to include, for example, any kind of tubular that is used in completing a well, such as, but not limited to, production tubing, production casing, intermediate casings, and devices through which hydrocarbons flow to the surface. Examples of such article include, in non-limiting embodiments, annular isolators used to block off non-targeted production or water zones, and the like.

The articles can be made directly from a composition containing carbon such as graphite and a binder through a one-step or a two-step process under the same conditions as described herein for carbon composites by choosing a mold having the desired shape. Alternatively, the articles are formed from carbon composites by shaping or machining or a combination thereof. Shaping includes molding, extruding, casting, and laminating. Machining includes cutting, sawing, ablating, milling, facing, lathing, boring, and the like using, for example, a miller, saw, lathe, router, electric discharge machine, and the like. The forms of the carbon composites used to make the articles are not particularly limited and include for example powders, pellets, sheets, bars, blocks, tubulars, cylindrical billets, toroids, and the alike.

Set forth below are various embodiments of the disclosure.

Embodiment 1

An article comprising a carbon composite containing carbon microstructures having interstitial spaces among the carbon microstructures; and a binder disposed in at least some of the interstitial spaces; wherein the carbon microstructures comprise unfilled voids within the carbon microstructures; and the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether.

Embodiment 2

The article as in any prior embodiment, wherein the binder is present in an amount of about 40 wt. % to about 80 wt. % based on the total weight of the carbon composite.

Embodiment 3

The article as in any prior embodiment, wherein the binder forms a binding phase that mechanically locks the carbon microstructures.

Embodiment 4

The article as in any prior embodiment, wherein the binding phase is free of particles.

Embodiment 5

The article as in any prior embodiment, wherein the carbon microstructures comprise microstructures of expanded graphite.

Embodiment 6

The article as in any prior embodiment, wherein the binder comprises polytetrafluoroethylene.

Embodiment 7

The article as in any prior embodiment, wherein less than 10 wt % of the carbon composite is thermally cracked, thermally degraded, or thermally decomposed when used continuously at a temperature of about 68° F. to about 500° F. and a pressure of about 50 psi to about 5,000 psi for more than 10 day when exposed to an acid comprising at least 50 vol % of one or more of the following: sulfuric acid; nitric acid; hydrochloric acid; or acetic acid.

Embodiment 8

The article as in any prior embodiment, wherein the article is a sealing element.

Embodiment 9

The article as in any prior embodiment, wherein the sealing element is a seal; a seal seat; a seal assembly; a packoff seal; a packer; a joint sheet; a gasket; a bridge plug; or packing.

Embodiment 10

The article as in any prior embodiment, wherein the seal is a static seal; a dynamic seal; a retrievable cementing packoff; a polished bore receptacle packoff; a wireline packoff; a head gasket, an exhaust gasket, a flange gasket; a valve packing; or a pump packing.

Embodiment 11

The article as in any prior embodiment, wherein the article is a downhole element comprising a seal, a high pressure beaded frac screen plug; a screen base pipe plug; a coating for balls and seats; a compression packing element; an expandable packing element; an O-ring; a bonded seal; a bullet seal; a sub-surface safety valve seal; a sub-surface safety valve flapper seal; a dynamic seal; a V-ring; a back-up ring; a drill bit seal; a liner port plug; an atmospheric disc; an atmospheric chamber disc; a debris barrier; a drill in stim liner plug; an inflow control device plug; a flapper; a seat; a ball seat; a direct connect disk; a drill-in linear disk; a gas lift valve plug; a fluid loss control flapper; an electric submersible pump seal; a shear out plug; a flapper valve; a gaslift valve; or a sleeve.

Embodiment 12

A method of forming an article comprising a carbon composite, the method comprising: compressing a composition containing carbon and a binder at a temperature that is about 10° C. to about 50° C. higher than the melting point of the binder and a pressure of about 500 psi to about 30,000 psi to form the article; the article comprising a carbon composite that includes the carbon microstructures having interstitial spaces among the carbon microstructures; and a binder disposed in at least some of the interstitial spaces; wherein the carbon microstructures comprise unfilled voids within the carbon microstructures; and the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether.

Embodiment 13

The method as in any prior embodiment, wherein the binder is present in an amount of about 40 wt. % to about 80 wt. % based on the total weight of the carbon composite.

Embodiment 14

The method as in any prior embodiment, wherein the binder becomes a liquid during the compressing.

Embodiment 15

A method of producing hydrocarbons from a subterranean location, the method comprising using one or more of an article comprising a carbon composite, the carbon composite comprising carbon microstructures having interstitial spaces among the carbon microstructures; and a binder disposed in at least some of the interstitial spaces; wherein the carbon microstructures comprise unfilled voids within the carbon microstructures; and the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether.

Embodiment 16

The method as in any prior embodiment, wherein the article is a packer.

Embodiment 17

The method as in any prior embodiment, wherein the article is exposed to a fluid comprising sulfuric acid, nitric acid, hydrochloric acid, acetic acid, or a combination comprising at least one of the foregoing at a temperature of greater than 150° F.

Embodiment 18

The method as in any prior embodiment, wherein the fluid contains greater than 50 vol % of sulfuric acid, nitric acid, hydrochloric acid, acetic acid, or a combination comprising at least one of the foregoing based on the total volume of the fluid.

Embodiment 19

A method of isolating or completing a wellbore comprising deploying an apparatus comprising an article in the wellbore, the article exposed to a fluid containing sulfuric acid, nitric acid, hydrochloric acid, acetic acid, or a combination comprising at least one of the foregoing at a temperature of greater than 150° F., and comprising a carbon composite, which contains carbon microstructures having interstitial spaces among the carbon microstructures; and a binder disposed in at least some of the interstitial spaces; wherein the carbon microstructures comprise unfilled voids within the carbon microstructures; and the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether.

Embodiment 20

The method as in any prior embodiment, wherein the fluid contains greater than 50 vol % of sulfuric acid, nitric acid, hydrochloric acid, acetic acid, or a combination comprising at least one of the foregoing based on the total volume of the fluid.

Embodiment 21

The method as in any prior embodiment, wherein the article is continuously resistive to one or more of thermal cracking, thermal degradation or thermal decomposition, at an ambient temperature of greater than 150° F. for more than 30 days.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology. "Average size" means "number average size."

What is claimed is:

1. A method of isolating or completing a wellbore comprising: deploying an apparatus comprising an article in the wellbore, the article exposed to a fluid containing sulfuric acid, nitric acid, hydrochloric acid, acetic acid, or a combination comprising at least one of the foregoing at a temperature of greater than 150° F., and comprising a carbon composite, which contains
    carbon microstructures having interstitial spaces among the carbon microstructures; and a binder disposed in at least some of the interstitial spaces;
    wherein the carbon microstructures comprise unfilled voids within the carbon microstructures; and
    the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether,
    wherein the fluid contains greater than 50 vol % of sulfuric acid, nitric acid, hydrochloric acid, acetic acid, or a combination comprising at least one of the foregoing based on the total volume of the fluid.

2. The method of claim 1, wherein the article is continuously resistive to one or more of thermal cracking, thermal degradation or thermal decomposition, at an ambient temperature of greater than 150° F. for more than 30 days.

3. The method of claim 1, further comprising producing hydrocarbon from a subterranean location.

4. The method of claim 1, wherein the binder is present in an amount of about 40 wt. % to about 80 wt. % based on the total weight of the carbon composite.

5. The method of claim 1, wherein the binder forms a binding phase that mechanically locks the carbon microstructures.

6. The method of claim 1, wherein the carbon microstructures comprise microstructures of expanded graphite.

7. The method of claim 1, wherein the binder comprises polytetrafluoroethylene.

8. The method of claim 1, wherein the article is a downhole element comprising a seal, a high pressure beaded frac screen plug; a screen base pipe plug; a coating for balls and seats; a compression packing element; an expandable packing element; an O-ring; a bonded seal; a bullet seal; a sub-surface safety valve seal; a sub-surface safety valve flapper seal; a dynamic seal; a V-ring; a back-up ring; a drill bit seal; a liner port plug; an atmospheric disc; an atmospheric chamber disc; a debris barrier; a drill in stim liner plug; an inflow control device plug; a flapper; a seat; a ball seat; a direct connect disk; a drill-in linear disk; a gas lift valve plug; a fluid loss control flapper; an electric submersible pump seal; a shear out plug; a flapper valve; a gaslift valve; or a sleeve.

9. The method of claim 1, wherein the article is a seal; a seal seat; a seal assembly; a packoff seal; a packer; a joint sheet; a gasket; a bridge plug; or packing.

10. A method of isolating or completing a wellbore comprising: deploying an apparatus comprising an article in the wellbore, the article exposed to a fluid containing sulfuric acid, nitric acid, hydrochloric acid, acetic acid, or a combination comprising at least one of the foregoing at a temperature of greater than 150° F., and comprising a carbon composite, which contains
- carbon microstructures having interstitial spaces among the carbon microstructures; and a binder disposed in at least some of the interstitial spaces;
- wherein the carbon microstructures comprise unfilled voids within the carbon microstructures; and
- the binder comprises one or more of the following: polytetrafluoroethylene; polyvinyl fluoride; polyvinylidene fluoride; polychlorotrifluoroethylene; perfluoroalkoxy alkane; fluorinated ethylene propylene; ethylene tetrafluoroethylene; ethylene chlorotrifluoroethylene; a peroxide cured copolymer of tetrafluoroethylene and propylene; a fluorocarbon rubber; perfluorocarbon rubber; or a perfluoropolyether,
- wherein the binder is present in an amount of about 40 wt. % to about 80 wt. % based on the total weight of the carbon composite; and
- the article is continuously resistive to one or more of thermal cracking, thermal degradation or thermal decomposition, at an ambient temperature of greater than 150° F. for more than 30 days.

11. The method of claim 10, wherein the binder is present in an amount of 50 wt. % to 70 wt. % based on the total weight of the carbon composite.

12. The method of claim 11, wherein the binder is present in an amount of 55 wt. % to 65 wt. % based on the total weight of the carbon composite.

* * * * *